Jan. 4, 1944.   L. H. BROWN   2,338,488
REAR VISION DEVICE
Filed Aug. 29, 1942
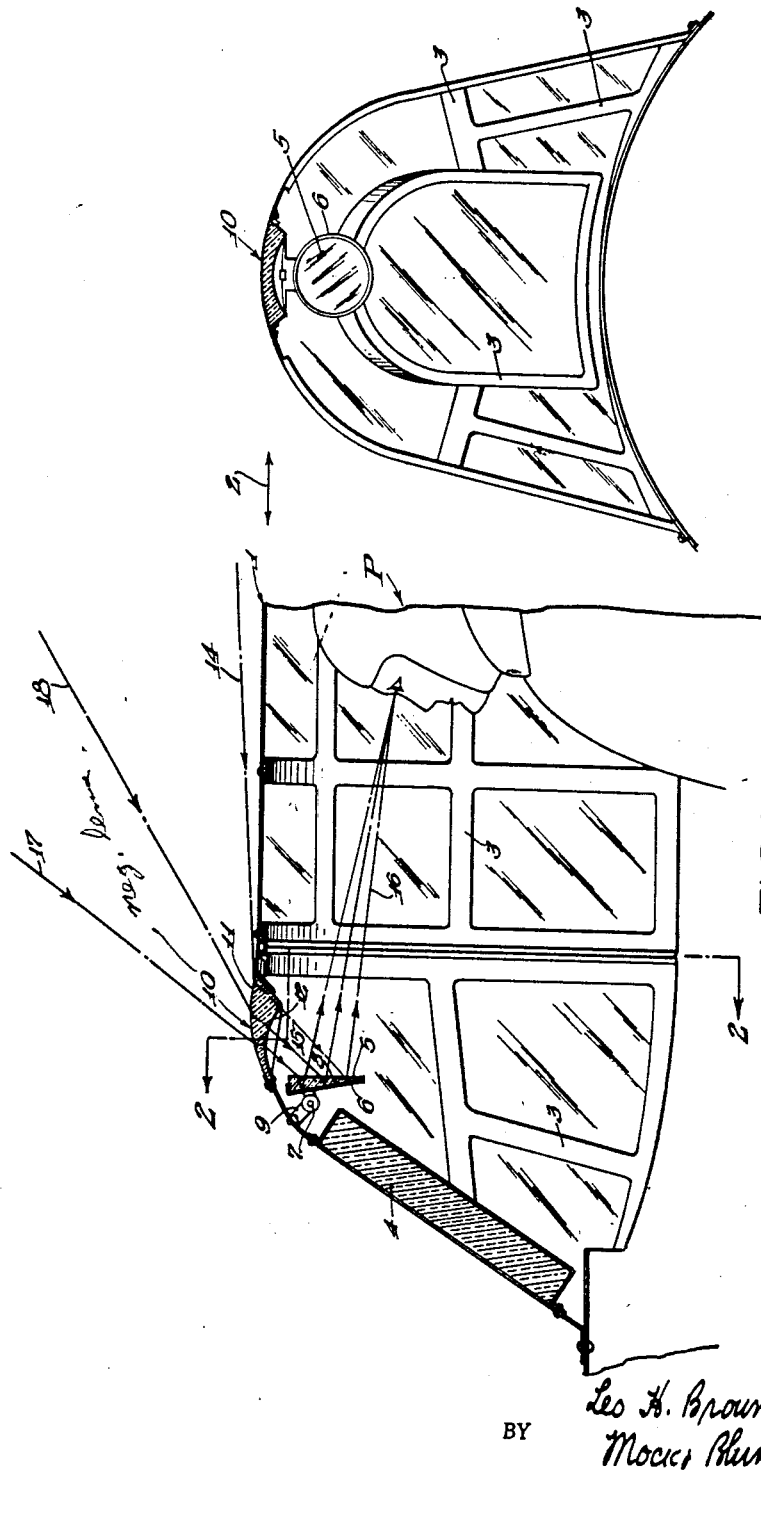
INVENTOR.
Leo H. Brown
BY
Mock, Blum
ATTORNEYS Patented Jan. 4, 1944

2,338,488

UNITED STATES PATENT OFFICE 2,338,488

REAR-VISION DEVICE

Leo H. Brown, New York, N. Y.

Application August 29, 1942, Serial No. 456,624

3 Claims. (Cl. 88—93)

My invention relates to a new and improved rear vision device for vehicles of all kinds, including airplanes, tanks and the like.

One of the objects of my invention is to permit the pilot or driver to have a wide range of rear vision beyond and above his seat.

Another object of the invention is to locate the essential parts of the rear vision apparatus, close to a windshield or similar device.

Another object of the invention is to provide rear vision apparatus which will project only very slightly, if at all, above the top of the airplane or other vehicle, so as to minimize wind resistance.

Another object of my invention is to locate the essential parts of the device in an airplane, so as to eliminate the necessity of looking through the light-permeable cockpit cover, in order to view a rear vision mirror which is located above said cockpit cover.

Numerous additional objects of the invention will be stated in the annexed description and drawing, which illustrate a preferred embodiment thereof.

Fig. 1 is a diagrammatic side elevation of the cockpit of an airplane to which the invention is applied, the optical devices being shown in vertical section.

Fig. 2 is a section on the line 2—2 of Fig. 1.

The invention is illustrated particularly in connection with an airplane. This airplane has the usual cockpit, and Fig. 1 shows the location at which the pilot P sits, in operating the airplane. The cockpit of the airplane is provided with the usual light-permeable cover or canopy 1, which is made of "Plexiglass" or any other suitable material. The trade mark "Plexiglass" refers to cast acrylic resin thermoplastic sheets. The resin is usually methyl methacrylate. This canopy 1 is slidable back and forth in the direction of the arrow 2.

The cockpit is provided with the usual frame, which has the conventional frame members 3. The windshield 4 is of the usual type, and it is made of the usual material. This windshield 4 is shown only diagrammatically in Fig. 1, because in actual practice the front part of said windshield is made of ordinary glass, and the rear part of said windshield is made of bulletproof glass.

The prism 5, which is made of glass or other light-permeable material, is held in a frame 6. In this particular embodiment, the prism 5 is wedge-shaped. It is tapered towards its bottom, so that the bottom part of said prism 5 is thinner than the top part thereof. The drawing is not to scale, and the bottom part of said prism 5 may be made very thin, almost a sharp edge. The angle of said prism may be from 10°–15°. However, this angle can be varied, and it may be as low as 5° or as high as 20°. Whenever any specific figures are stated herein, the same are stated only by way of example, and without limiting the invention thereto.

The front wall 8 of the prism 5 is treated so that it reflects light to the maximum extent. For this purpose, said front wall 8 may be silvered, or otherwise provided with an opaque reflecting layer, which reflects 90% of the light or more. Maximum reflection of light may be desirable for many purposes. For other purposes, where it is desired not to have the image too bright, the front wall 8 may be provided with a reflecting layer which will reflect any desired proportion of the incident light. The frame 6 has a lug which is connected to the pivot pin 7, which is fixed to a bracket 9, which is fixed to the frame of the airplane, above the windshield 4. The frame 6 of the prism 5 can thus be held adjusted at any desired angle relative to the eye of the pilot. Suitable conventional friction or clamping means can be provided for holding the frame 6 of the prism 5 in any desired adjusted position. A complementary optical member 10 is located above the prism 5. This complementary optical member 10, like the prism 5, can be made of glass or of any other suitable material, such as any light-permeable thermoplastic or thermosetting resin.

The top wall 11 of the member 10 preferably has the shape of a part of a sphere. However, the invention is not limited to this particular shape, as long as the complementary member 10 fulfills the functions which are later stated herein. The bottom wall 12 of the member 10 also preferably has the shape of a part of a sphere. The sphere which corresponds to the bottom wall 12, has a smaller radius than the sphere which corresponds to the top wall 11. The front end of the member 10 is thinner than the rear end thereof. The member 10 is rigidly fixed to the frame of the airplane, in any suitable manner.

The associated optical members 5 and 10 are shaped so as to provide maximum correction for chromatic aberration. Said members 5 and 10 can be made of the same material. If the prism 5 were replaced by a mirror of uniform thickness, substantial chromatic aberration would be produced by the transmission of the light through the member 10.

The thick end of the prism 5 is adjacent the thin end of the complementary member 10. Therefore, the angles of the tapered members 5 and 10 can be designated as being in opposed relation. If the incident ray 14 is a ray of white light, said incident ray will be refracted through the member 10 in the general direction 15, but the rays of respectively different colors and respectively different wave lengths which compose said white incident ray 14, will be refracted at different angles, thus producing chromatic aberration. These diverging respective rays are transmitted through the prism 5 to its front mirror surface, and said respective rays are reflected from said mirror surface 8, and said respective rays are transmitted to the eye of the pilot in the general direction 16. The respective rays of respective different wave lengths are thus transmitted to the eye of the pilot in close or in substantial parallelism, thus correcting the initial divergence which is produced by the refraction through the complementary member 10, so that the eye of the pilot will perceive white light, if the incident ray 14 is a beam of white light. While this correction is not absolute, it is highly preferable to the use of an ordinary mirror in place of the prism 5. This chromatic correction is produced by the tapered optical member 5, by reason of its tapered shape, which produces an approximate parallelism of the diverging beam of rays which move generally in the direction 15. The angle of rear vision is a wide one, and it embraces the field between the incident rays 14 and 17. Rear vision is thus provided from a point from which the incident beams of light are substantially parallel to and substantially at the level of the top surface of the canopy 1. Fig. 1 also shows an incident ray 18 which is intermediate the rays 14 and 17, and it illustrates how the field of view which is between the rays 14 and 17 can be viewed by the pilot. As previously stated, rays intermediate the top surface of the canopy 1 and the ray 14 are also transmitted by the associated optical members to the eyes of the pilot. As shown in Fig. 2, the end elevation of the prism 5 is circular, in this embodiment. However, the edge of each face of the prism 5 can be of any suitable shape, such as a part of a circle, rectangular or the like.

Another advantage of the wedge-shaped reflecting device 5 over an ordinary mirror of uniform thickness, is that said member 5 can be made smaller than such ordinary mirror, while giving the same effective angle of rear vision. If the ordinary mirror is tilted in order to provide rear vision, the effect is to diminish the effective apparent area of the mirror. The wedge shape or tapered shape of the member 5 makes it possible to have a large effective field of rear vision, while confining said member 5 to relatively small dimensions.

The wall 11 of the complementary member 10 projects only very slightly above the top of the canopy 1, thus minimizing wind resistance.

The members 10 and 5 can be made of glass, or of any suitable light-permeable resin. Since the member 10 is not achromatic, if the incident beam is of white light, there will be a divergence between the different colors which pass out of the member 10 into the air. However, the prism 5 corrects this divergence, so that the rays which are reflected to the eyes of the pilot are sufficiently parallel, in order to eliminate a substantial part of the effect of chromatic abberation. The member 10 can be replaced by an ordinary prism. In effect, the member 10 is a prism which has a concave wall and a convex wall, instead of the ordinary diverging planar walls of a prism. However, and as previously stated, an ordinary prism with diverging planar walls can be used instead of the member 10. Likewise, when I refer to a prism 5, I refer to any suitable optical member which has one end thicker than the other end, so as to produce the general optical effect of a prism.

Fig. 1 is approximately to scale and reference is made thereto for further details.

In a practical embodiment, the convex surface 11 of the member 10 has a radius of curvature of about 16 inches. The concave surface 12 of said member 10 has a radius of curvature of about 4.5 inches, in such practical embodiment. In said practical embodiment, the angle of the prism 5 is about 15°. These figures are given only as an illustration of one practical embodiment, and without limiting the invention thereto.

I have shown a preferred embodiment of my invention, but it is clear that numerous changes and omissions can be made without departing from its spirit.

I claim:

1. A rear vision device for an airplane which has a windshield and which also has a cockpit which has a top wall and an observation post in said cockpit, said rear vision device comprising a first optical member, said first optical member having a top wall which is substantially at the same level as the top wall of said cockpit, said first optical member being located above the top of said windshield, the front end of said first optical member being thinner than its rear end, said first optical member being located and shaped to refract incident rays forwardly in a downwardly inclined path, a second optical member which is located below said first optical member, said second optical member having a lower end which is thinner than the upper end of said second optical member, said second optical member having a reflecting front wall, said second optical member being in the path of the rays which are refracted through said first optical member so that said rays are reflected from said front wall, said second optical member having said reflecting front wall located and shaped to reflect the incident light thereon rearwardly in a downwardly inclined path to the observation post, said second optical member being shaped substantially to correct the chromatic aberration which results from the refraction through the first optical member.

2. A rear vision device according to claim 1, in which said first optical member has a top wall and a bottom wall, each said wall having the shape of a part of a respective sphere, the top wall being convex and the bottom wall being concave, the radius of curvature of the respective sphere of the bottom concave wall being less than the radius of curvature of the respective sphere of the convex top wall.

3. A rear vision device for use at an observation post, said rear vision device comprising an upper optical member and a lower optical member, the upper optical member having a front end which is thinner than its rear end, said upper optical member being located at a level which is higher than the level of said observation post, said upper optical member being shaped to refract forwardly moving incident rays forwardly in a downwardly inclined path, the lower optical member being also located at a level which is higher than the level of said observation post, said first optical member being located and shaped to thus refract incident rays which are substantially horizontal, said lower optical member having a reflecting front wall, said lower optical member having a lower end which is thinner than its upper end, said reflecting front wall being located to reflect the incident rays rearwardly in a downwardly inclined direction to said observation post, said lower optical member being shaped to substantially correct the chromatic aberration which results from the refraction through the upper optical member.

LEO H. BROWN.